June 28, 1938. G. L. DAVIES 2,122,091
METHOD AND APPARATUS FOR PRODUCING COURSE INDICATION
Original Filed Sept. 1, 1936
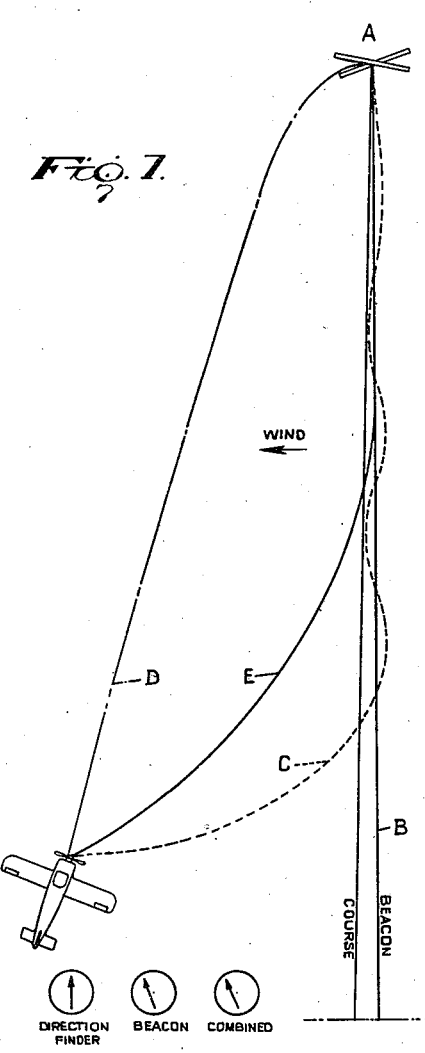
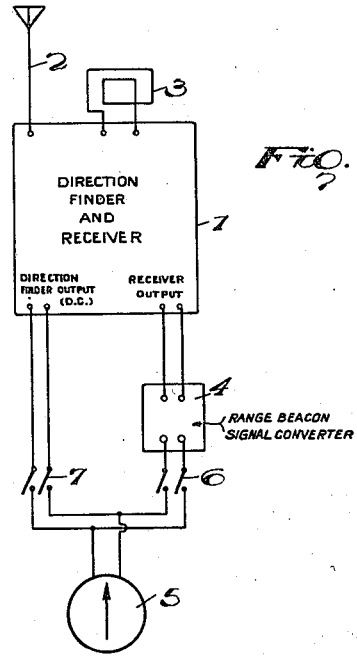
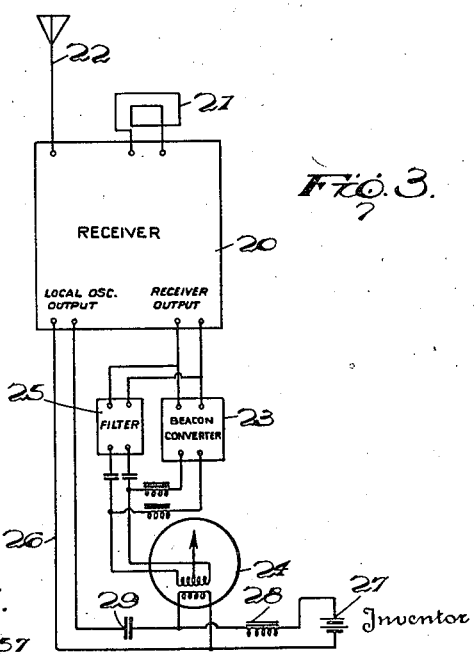
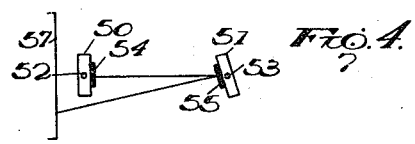
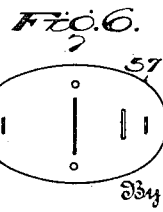
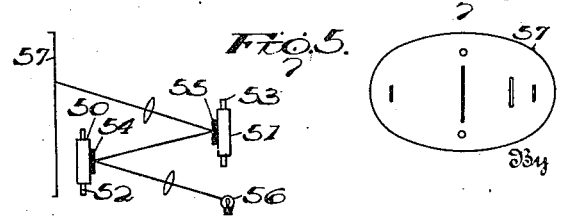
Inventor
Gomer L. Davies.
By Samuel Scrivener Jr.
Attorney Patented June 28, 1938

2,122,091

UNITED STATES PATENT OFFICE 2,122,091

METHOD AND APPARATUS FOR PRODUCING COURSE INDICATION

Gomer L. Davies, Silver Spring, Md., assignor to Washington Institute of Technology, Inc., Washington, D. C., a corporation of Delaware Application September 1, 1936, Serial No. 99,003
Renewed November 26, 1937

14 Claims. (Cl. 250—11)

This invention relates to the navigation of aircraft or other mobile stations along or with respect to radio beacon courses and is intended to provide methods and means for producing on a mobile station such as an aircraft an indication which will be a function of both the heading of the mobile station toward the station which transmits the radiations establishing the beacon course and the position of the mobile station with respect to the course.

There are at present two general types of systems or devices employed for guiding aircraft or other mobile stations toward or from a known point, these being, first, systems or devices adapted to provide on the aircraft an aural, visual or other indication of the heading of the aircraft toward the known point and, secondly, systems or devices for providing an aural, visual or other indication on the aircraft of the position thereof with respect to a beacon course having its origin at a known transmitting point, or being disposed in a known relation to a known point.

There are a number of known means for producing the heading indication referred to above, among these being the magnetic compass, directional gyroscope and radio direction finder. While any means for producing such a heading indication may be employed in systems according to the present invention, the invention will be described in this application particularly in connection with a radio direction finder. Such a device, as is well known in the art, is adapted to be tuned to receive the radiations from any radio transmitter toward which it is desired to guide the mobile station or aircraft which carries the direction finder, and from the received radiations the direction finder is arranged to provide an indication, which may be aural, visual or otherwise, of the heading of the aircraft toward the transmitting station. While the direction finder will actually provide an indication of any deviation of the heading of the aircraft from a straight line toward the transmitting point, it has been found under practical operating conditions that any side wind or drift will cause the aircraft to describe an arcuate course in approaching the transmitting point, although the heading of the aircraft is constantly toward the transmitter and such heading is constantly indicated by the radio direction finder means.

The second guiding means referred to and by which is provided an aural, visual or other indication of the position of the aircraft with respect to a definite and known course in space, is particularly exemplified by the range beacon systems now in use. These beacons, which are generally of the well-known equisignal type, operate to provide an equisignal zone defining a course in space having its origin at the transmitting point. The equisignal beacons may be of the aural or visual type and in either case means are provided on the aircraft for indicating either aurally or visually the position of the aircraft with respect to the established course. Other types of directional beacons are known and are adaptable to the present invention provided only that the beacon radiations will operate means on the aircraft giving an indication of the position of the aircraft with respect to the course. Among other types of beacon systems which operate to provide indications of this kind may be mentioned the phase beacon systems of the type disclosed in my copending application Serial No. 68,133, filed March 10, 1936.

It has been found in practice to be difficult, if not practically impossible, to maintain the aircraft always in the equisignal zone or on the course established by the beacon, of whatever type, or on a course set in a pre-determined manner by the tuning of the aircraft beacon receiver, as in my co-pending application Serial No. 68,133. This is due to the fact that no heading indication is provided by the output of the beacon signal converter or other receiving means, and due also to the fact that the immediate control of the aircraft must be accomplished by means of an instrument giving a directional heading, such as a radio direction finder, a directional gyroscope or turn indicator. The necessity for the use of the two instruments renders the navigation of the aircraft more difficult and it has been found to be almost impossible to prevent the course of the aircraft from weaving back and forth across the beacon course.

It is therefore proposed by the present invention to combine the heading effect produced by the radio direction finder, turn indicator or other directional means with the positional effect produced by the beacon signal converter or other beacon receiving means, to provide on the aircraft an aural, visual or other indication of the course of the aircraft, which indication will be a function of both the heading of the aircraft with respect to the transmitting point and the position of the aircraft with respect to the beacon course.

According to one form of this invention, I propose to combine the output of a radio direction finder or other directional indicator with that of an equisignal beacon signal converter or the output of any other beacon receiving means, both of which devices are tuned to receive the radiations from a single beacon transmitter, and to supply the combined outputs to a single indicating means. I have found that if a radio direction finder is supplied by the output of a receiver used for beacon reception, the direction finder output is dependent upon the heading of the aircraft with respect to the transmitting station, and the receiver output due to the beacon signal is dependent upon the position of the aircraft with respect to the beacon course. If both outputs are fed to the same indicating instrument, the reading of this instrument will be a function of the heading of the aircraft as well as its position and, if the connections are made in the proper sense, a deviation of the mobile station from the proper course causes a deviation of the instrument from zero position which can be corrected by turning the mobile station toward course. Further, the only line in space along which the mobile station can be navigated directly toward the transmitter with the indicator reading "on course" is the course of the beacon. Thus, with such an arrangement, the indicator has merely to be kept reading "on course" to insure that the aircraft will follow the course to the transmitter, little or no reference to the compass or gyro being necessary as the indicator itself may be used as the turn indicator to maintain the proper heading.

The path followed by a mobile station using such a combined indication, and shown in full line E in Fig. 1, is given by the equation:

$$r = \frac{r_0 \cos \theta_0}{\sin \theta_0} \cdot \frac{\sin \theta}{\cos 2\theta}$$

in which $r$ and $\theta$ are the polar co-ordinates of the mobile station at any point of its path, and $r_0$ and $\theta_0$ are the co-ordinates of the starting point. This equation assumes the magnitude of the direction finder and beacon converter currents through the indicating instrument to be equal. If they are unequal the equation of the path is rather complex, but the path has the same general characteristics.

According to the invention the combined indication may be produced, if desired, by the combination, before indication, of the effects or outputs of the means which separately would produce the directional and positional indications. Such means may be of any of the various types by which such indications may be produced. By this means these effects combine to produce a single indication which is a function of both the heading of the aircraft toward the transmitting station and the position of the aircraft with respect to course.

According to a second aspect of the invention it is proposed to produce separately the indications of the directional and positional aspects of the aircraft, and to then combine the indications so produced to thereby provide a combined indication which will be a function of both the heading of the aircraft with respect to the transmitting station and of the position of the aircraft with respect to course.

In all cases, and without regard to the particular means provided to secure either the directional or positional effects or indications, or the means for combining these effects or the indications produced thereby, it is the primary object of the invention to provide a single indication on the mobile station of the directional and positional aspects of the aircraft.

A second object of the invention is to provide means and apparatus for producing the combined indication referred to.

Other objects and features of novelty will be apparent from the following description and the annexed drawing, it being expressly understood, however, that such description and drawing are merely illustrative of the invention, which is not limited in any way thereby, or otherwise than by the appended claims.

Referring to the drawing, in which similar reference characters refer to like parts, Fig. 1 is a diagrammatic view showing the effect of the invention in navigating an aircraft toward or from a beacon, Figs. 2 and 3 disclose means and apparatus for combining the effects of various direction finder circuits and beacon receiving circuits to provide a combined indication, and Figs. 4, 5 and 6 are, respectively, top, side and front views of one means according to the invention for combining produced indications of the directional and positional aspects of a mobile station.

As stated hereinbefore, the primary object of the invention is to provide on a mobile station a single indication which will be a function of both the directional heading of the mobile station and the position of the mobile station with respect to a beacon course. In Fig. 1 of the drawing, there are illustrated the various paths which may be followed by an aircraft in flying toward a transmitting station A. The beacon course is indicated by the letter B and, in the event that the beacon is of the equisignal type, the course B will be defined by a zone of equal signal intensity. If the beacon system is of some other type such as the phase beacon system disclosed in my co-pending application Serial No. 68,133, filed March 10, 1936 the course B will be determined by proper phasing adjustment of the receiving means on the mobile station, but after such adjustment the course B will remain fixed, so that an indication of the position of the mobile station with respect thereto may be provided.

Regardless of the type of beacon employed at A, the aircraft may be provided with means for indicating the position of the aircraft with respect to the course B. In the position of the aircraft as illustrated in Fig. 1, which is to the left of course, the indicating means will provide an indication of this position of the aircraft if operated separately, as shown by the indicator drawing of Fig. 1. If the beacon indication alone is followed, the pilot will know, at any time, only his position with respect to course and will have no knowledge of his headings with respect to the terminal or transmitting point. Accordingly, following only the positional indication, the aircraft will follow the dotted line course C in flying toward the transmitter A. It has been found in practice that, if the beacon signal alone is used as a guiding means, the aircraft will fly from the position illustrated in Fig. 1 almost at a right angle to course until the equisignal zone is intercepted, after which the path of the aircraft will weave back and forth across the course due to the inherent deficiencies of the beacon indications as set forth hereinbefore.

If a heading indication alone is employed in navigating the aircraft, the heading of the aircraft may be kept at all times directly toward the transmitter A, but the path described by the aircraft in approaching the transmitter will not be a straight line, but will be generally arcuate as shown by the broken line D in Fig. 1, this provided the wind is in the direction shown by the arrow. Such a heading indication may be provided by a radio direction finder, gyroscopic compass, or other means, although the invention is particularly described in connection with the use of a radio direction finder tuned to receive the radiations from the transmitter A.

The direction finder pointer indication will be zero at all times, as illustrated in Fig. 1, provided the heading of the aircraft is maintained toward the transmitter A, this without relation to the absolute course D traveled by the aircraft in approaching transmitter A. If the beacon indication alone is followed, such indication will be as illustrated in Fig. 1 so long as the aircraft is to the left of course. If, now, a combined indication, which is a function of the directional and positional aspects of the aircraft, is provided, such combined indication will be as illustrated in Fig. 1 and if the aircraft is navigated in accordance with such combined indication, the resultant course of the aircraft in approaching the transmitter A will be as shown in full line E of Fig. 1.

In Fig. 2 there is disclosed diagrammatically a circuit arrangement which may be employed for combining the output of a radio direction finder circuit and the output of a beacon signal receiver circuit for providing such a combined indication as is contemplated by the present invention. The circuit illustrated comprises the non-directional antenna 2 and the directional antenna 3 which are adapted to intercept radiations from the transmitting station toward which the aircraft is to be navigated, and which supply energy received from such radiations to a direction finder and receiver, shown as a combined unit 1. The output of the direction finder circuit is connected through a switch 7 to the terminals of a course-indicating device 5 which may be of the zero-center milliammeter type if the output of the direction finder circuit is a direct current. The receiver output is also supplied to the terminals of the indicator 5 through a switch 6. If the transmitting station to which the receiver and direction finder are tuned is an equisignal beacon, a beacon signal converter, such as a reed converter, is inserted in the circuit between the receiver output and the indicator in order to supply to the indicator a direct current which is proportional in strength to the position of the aircraft with respect to the beacon course.

It will be apparent that, by selective operation of switches 6 and 7, the indicator 5 may be made to respond to either the direction finder output current or the beacon receiver output in order to provide either a directional or positional indication. If both switches 6 and 7 are closed, the direction finder and beacon receiver outputs will both be supplied to the indicator 5 in order to provide the combined indication contemplated by the invention.

While the invention contemplates that any direction finder circuit or other means operable to provide a directional heading may be employed, an illustration of the use in the invention of a second type of direction finder is shown in Fig. 3. In this circuit a dynamometer type indicator 24 is employed, the fixed coil of which may be supplied with alternating current from a local audio frequency source through circuit 26 and blocking condenser 29, and with direct current from a local source 27 through a circuit including an audio frequency choke 28. The movable coil of the indicating meter may be supplied with the direct current output of a beacon signal converter 23, which may be a reed converter, and with alternating current at the frequency of the local source, the phase and amplitude of which are dependent upon the heading of the aircraft with respect to the transmitting station. Such alternating current is supplied to the movable coil of the indicator through a filter 25 which eliminates the beacon frequencies. The operation of the circuit disclosed in Fig. 3 will be apparent and is such that the movable coil of the indicator will be operated to provide an indication which will be a function of the direction finder circuit currents and the beacon converter output and which will therefore be a function of the heading of the aircraft and its position with respect to the beacon course.

It is to be distinctly understood that the invention is not limited to any particular means or to any particular direction finder circuit for providing a directional indication, but that any means operable to provide an indication of the heading of the aircraft may be employed. It is also to be understood that the invention is not limited to use with any particular type of beacon, but may be employed with any system which is operable to define a course in space, whether this be a course defined by radiated fields, such as the equisignal beacon, or a system in which the course is defined by phasal adjustment of currents received on the aircraft from the transmitter, such as is described in my co-pending application Serial No. 68,133, or any other type of beacon.

The means heretofore described for carrying out the invention operate by combining the effects which produce the indications and then producing an indication of the combined effects. It is also proposed by the invention to provide means for producing separate directional and positional indications and to then combine these indications themselves to produce a combined indication. One means for effecting this is disclosed in Figs. 4, 5 and 6.

The system disclosed in these figures comprises two supports 50 and 51 which are respectively pivoted to rotate freely about preferably vertically arranged pivots 52, 53. The supports are spaced a desired distance apart and one of the supports, such as 51 is disposed slightly above the support 50 in a vertical direction. The opposed faces of the pivoted supports carry facing mirrors 54, 55. A light source 56 is so arranged that light therefrom will travel to mirror 54 and will be reflected therefrom to mirror 55 and from thence to a translucent screen 57. A suitable lens system may be provided for properly focusing the beam of light from source 56 and for causing the reflected beam from mirror 55 to appear on the screen 57 as a dot or line of light. The screen 57 may be provided with a center-line which will provide a zero or on-course indicating means, the dot or line of light reflected from mirror 55 being adapted to move to the right or left of the zero-line to indicate deviations of the aircraft from course.

The supports 50, 51 are arranged to be rotated about their pivots in accordance with the directional and positional aspects of a mobile station on which they may be mounted. Thus, the support 50 may be actuated by the output of a radio direction finder circuit in such a manner that its angular position will be a function of the directional heading of the mobile station. The support 51 may be operated by the output of a beacon signal converter in such a manner that its angular position about its axis will be a function of the position of the air-craft with respect to a pre-determined course.

It will be apparent that as the angular relationship of the supports 50 and 51 varies as the directional and positional aspects of the mobile station change, the position of the dot or line of light on the screen 57 will change and will move in one direction or another from the zero-center line thereon. The position of the dot or line of light with respect to the zero indication will therefore constantly be a function of the directional heading of the mobile station with respect to the transmitting station which radiates the signals being received and of the position of the mobile station with respect to the pre-determined or established course. It will thus be seen that means are provided for combining separate directional and positional indications in order to provide a combined indication of the character set forth.

The effect of 180° course reversal of the aircraft will not adversely affect the operation of the system. While it will be apparent that for each position in space of the aircraft there will be two possible headings in which any given course indication will be produced, the sense of the pointer deviation for any turning of the aircraft will provide an indication of the heading of the aircraft toward or away from the source of received radiations, as in radio direction finder operation generally. Thus, if the aircraft is heading 180° from the station, a turn to the right will produce a deflection of the pointer of the indicating instrument to the right, thereby indicating that the aircraft is heading away from the beacon and must be turned through 180° if a heading toward the beacon is desired.

While I have illustrated and described certain forms which my invention may take and which will be operable to carry out the method according to the invention, it will be apparent to those skilled in the art that my invention may be practised by other means than those disclosed, and that the limits of the invention must be found by reference to the appended claims.

I claim:—

1. A system for producing an indication of the course of a mobile receiving station with respect to a transmitting station, which comprises means on the mobile station operable to produce an indication of the heading of the mobile station with respect to the transmitting station, means on the mobile station operable to produce an indication of the position of the mobile station with respect to a pre-determined course, and means on the mobile station for combining the effects or outputs of said means to produce a single combined indication which is a function of the heading of the mobile station with respect to the transmitting station and of the position of the mobile station with respect to the course.

2. A system for producing an indication of the course of a mobile receiving station with respect to a transmitting station, which comprises means on the mobile station for producing an indication of the heading of the mobile station with respect to the transmitting station, means on the mobile station for producing an indication of the position of the mobile station with respect to a pre-determined course in space, and means on the mobile station for producing a single indication which is a function of the heading of the mobile station with respect to the transmitting station and of the position of the mobile station with respect to the said course.

3. A system for producing an indication of the course of a mobile receiving station with respect to a transmitting station, which comprises means on the mobile station operable to produce an indication of the heading of the mobile station with respect to the transmitting station, means on the mobile station operable to produce an indication of the position of the mobile station with respect to a pre-determined course having its origin at the said transmitting station, and means on the mobile station for producing a single indication which is a function of the heading of the mobile station with respect to the transmitting station and of the position of the mobile station with respect to the said course.

4. A system for producing an indication of the course of a mobile receiving station with respect to a transmitting station, comprising means for producing an indication of the heading of the mobile station with respect to the transmitting station, means for producing an indication of the position of the mobile station with respect to a pre-determined course, and means for combining the indications so produced for producing a single, combined indication which is a function of the heading of the mobile station with respect to the transmitting station and of the position of the mobile station with respect to the course.

5. A system for producing an indication of the course of a mobile receiving station with respect to a transmitting station from which are radiated a plurality of directional fields which overlap in space to provide an equisignal zone defining a course passing through the transmitting station, comprising means for receiving the radiations from the transmitting station to produce on the mobile station a current which is proportional to the difference between the strengths of the radiated fields at the point of location of the mobile station, means for receiving the radiations from the transmitting station to produce on the mobile station currents which vary in magnitude and phase in accordance with the heading of the mobile station with respect to the transmitting station, means for combining the currents produced by said two means, and means for supplying said combined currents to an indicating device to provide an indication which is a function of the position of the mobile station with respect to the said course and of the heading of the mobile station with respect to the transmitting station.

6. Means for producing an indication of the course of a mobile receiving station with respect to a transmitting station from which are radiated a plurality of directional fields which overlap in space to provide an equisignal zone defining a course toward the transmitting station, comprising means for receiving and detecting the said radiated fields to produce from said received radiations currents which are proportional to the relative strengths of the radiated fields at the point of location of the mobile station, means for producing from said received radiations currents which vary in magnitude and phase in accordance with the heading of the mobile station with respect to the transmitting station, means for combining said currents, means movable in response to the flow of currents therethrough to produce an indication of the magnitude of the resultant current flow therethrough, and means for supplying said combined currents to said indicating means.

7. A radio receiving system for producing an indication of the course of a mobile receiving station with respect to a transmitting station from which are radiated a plurality of fields which intersect in space to provide an equisignal zone defining a course toward the transmitting station, comprising means for producing currents proportional to the relative strengths of the radiated fields at the point of location of the mobile station, means for producing currents which vary in magnitude and phase relationship to each other in accordance with the heading of the mobile station with respect to the transmitting station, an indicator device responsive to opposed flows of current therethrough to indicate the magnitude and direction of the resultant flow of current therethrough, selective means for causing either of said produced currents to flow through said indicator device to provide an indication of either the heading of the mobile station with respect to the transmitting station or of the position of the mobile station with respect to the course, means for combining the currents produced by said two means, and means for supplying said combined currents to said indicating device to produce an indication which is a function of the heading of the mobile station with respect to the transmitting station and of the position of said mobile station with respect to the course.

8. A system for producing an indication of the course of a mobile receiving station with respect to a transmitting station from which are radiated a plurality of directional fields which overlap in space to provide an equisignal zone defining a course passing through the transmitting station, comprising means for receiving the radiations from the transmitting station to produce on the mobile station a current which is proportional to the difference between the strengths of the radiated fields at the point of location of the mobile station, means for receiving the radiations from the transmitting station to produce on the mobile station a current which varies in accordance with the heading of the mobile station with respect to the transmitting station, means for combining the currents produced by said means, and means for supplying said combined currents to an indicating device to provide an indication which is a function of the position of the mobile station with respect to the course and of the heading of the mobile station with respect to the transmitting station.

9. A system for producing an indication of the course of a mobile receiving station with respect to a transmitting station from which are radiated one or more signals from which a mobile station may secure an indication or signal denoting its position with respect to a predetermined course, comprising means for receiving, detecting and amplifying the radiations from the transmitting station to provide on the mobile station currents which are functions of the heading of the mobile station with respect to the transmitting station and of the position of the mobile station with respect to the course, means for combining said currents, and means for causing said combined currents to produce an indication which is a function of the heading of the mobile station with respect to the transmitting station and of the position of the mobile station with respect to the course.

10. A system for producing an indication of the course of a mobile receiving station with respect to a transmitting station from which are radiated one or more signals from which a mobile receiving station may secure a positional indication with respect to a predetermined course, comprising means on the mobile station for receiving said signals, means for producing from said received signals currents which vary in accordance with the heading of the mobile station with respect to the transmitting station and other currents which vary in accordance with the position of the mobile station with respect to the course, means for combining said currents, and means for producing from said combined currents an indication which is a function of the heading of the mobile station with respect to the transmitting station and of the position of the mobile station with respect to the course.

11. A system for producing an indication of the course of a mobile receiving station with respect to a transmitting station, comprising means on the mobile station operable to provide an indication of the heading of the mobile station with respect to the transmitting station, means on the mobile station operable to provide an indication of the position of the mobile station with respect to a course in space, means for combining the outputs of said means, and means for causing said combined outputs to provide a single indication which is a function of the heading of the mobile station with respect to the transmitting station and of the position of the mobile station with respect to the course.

12. A system for producing an indication of the course of a mobile receiving station with respect to a transmitting station, comprising means on the mobile station operable to produce from the received radiations from the transmitting station a direct current which varies in strength in accordance with the heading of the mobile station, means on the mobile station operable to produce from the received radiations from the transmitting station a direct current which varies in strength in accordance with the position of the mobile station with respect to a course in space, means for combining said currents, and means for supplying said combined currents to an indicator to provide an indication which is a function of the heading of the mobile station with respect to the transmitting station and of the position of the mobile station with respect to the course.

13. A system for producing an indication of the course of a mobile receiving station with respect to a transmitting station, which comprises a light source, a screen, means movable in response to variations in the heading of said mobile station with respect to the transmitting station, means movable in response to variations in the position of the mobile station with respect to a predetermined course in space, said two means being so constructed and arranged as to reflect light from said source to said screen, whereby the position of the beam of light on said screen is a function of the heading of the mobile station with respect to the transmitting station and of the position of the mobile station with respect to the course.

14. A system for producing an indication of the course of a mobile receiving station with respect to a transmitting station, which comprises two reflecting means disposed on the mobile station, each of said reflecting means being rotatable about an axis which passes through or is parallel to the plane thereof, means for causing one of said reflecting means to assume a position about its axis which is a function of the heading of the mobile station with respect to the transmitting station, means for causing the other of said reflecting means to assume a position about its axis which is a function of the position of the mobile station with respect to a predetermined course in space, a light source adapted to cause a beam of light to fall on one of said reflectors, said reflectors being so arranged that the beam of light from said one reflector will be reflected to the second reflector, and a screen which is so arranged that the beam of light reflected from the second reflector falls on said screen, whereby the position of the beam of light on said screen is a function of the angular positions of said two reflectors.

GOMER L. DAVIES.